(12) United States Patent
Bauer et al.

(10) Patent No.: US 12,311,492 B2
(45) Date of Patent: May 27, 2025

(54) METHOD AND APPARATUS FOR FORMING A CONVEX END FACE IN A FERRULE

(71) Applicant: Corning Research & Development Corporation, Corning, NY (US)

(72) Inventors: Markus Bauer, Pittsford, NY (US); Cameron John Tovey, Painted Post, NY (US)

(73) Assignee: Corning Research & Development Corporation, Corning, NY (US)

(*) Notice: Subject to any disclaimer, the term of this patent is extended or adjusted under 35 U.S.C. 154(b) by 1044 days.

(21) Appl. No.: 17/319,455

(22) Filed: May 13, 2021

(65) Prior Publication Data

US 2021/0260715 A1 Aug. 26, 2021

Related U.S. Application Data

(63) Continuation of application No. PCT/US2019/058762, filed on Oct. 30, 2019.

(60) Provisional application No. 62/769,523, filed on Nov. 19, 2018.

(51) Int. Cl.
*B24B 19/22* (2006.01)
*B24B 41/00* (2006.01)
*B24B 41/02* (2006.01)
*G02B 6/38* (2006.01)

(52) U.S. Cl.
CPC .......... *B24B 19/226* (2013.01); *B24B 41/005* (2013.01); *B24B 41/02* (2013.01); *G02B 6/3863* (2013.01)

(58) Field of Classification Search
CPC ..... B24B 19/226; B24B 41/005; B24B 41/02; B24B 5/16; B24B 47/02; B24B 47/10; B24B 13/02; B24D 5/14
USPC ........................................................... 451/41
See application file for complete search history.

(56) References Cited

U.S. PATENT DOCUMENTS

| 5,432,880 A | 7/1995 | Diner |
| 5,583,290 A | 12/1996 | Lewis |
| 2003/0190875 A1 | 10/2003 | Grabbe |

(Continued)

FOREIGN PATENT DOCUMENTS

| JP | 62-034763 A | 2/1987 |
| JP | 01-097555 A | 4/1989 |

(Continued)

OTHER PUBLICATIONS

WO-03000461-A1 espacenet (Year: 2024).*

(Continued)

*Primary Examiner* — Brian D Keller
*Assistant Examiner* — Sidney D Full

(57) ABSTRACT

A method of processing a ferrule end face using at least one grinding wheel rotatable about a central axis and having a working surface with an abrasive element is provided. The method includes holding the ferrule stationary, engaging the end face of the ferrule and the working surface of the at least one grinding wheel, rotating the at least one grinding wheel about the central axis, and moving the at least one grinding wheel relative to the ferrule along a curve perpendicular to the central axis. Processing the ferrule in this manner imparts a convex shape of the end face of the ferrule. An apparatus for carrying out the method is also disclosed.

19 Claims, 5 Drawing Sheets

(56) References Cited

U.S. PATENT DOCUMENTS

| | | | | |
|---|---|---|---|---|
| 2004/0043706 A1* | 3/2004 | Wang | ................... | B24B 19/226 |
| | | | | 451/41 |
| 2004/0179788 A1* | 9/2004 | Fleenor | ............... | G02B 6/3863 |
| | | | | 385/79 |
| 2011/0275283 A1* | 11/2011 | Pepin | ..................... | B24B 23/03 |
| | | | | 451/340 |
| 2014/0323020 A1* | 10/2014 | Kaul | ..................... | B24D 5/066 |
| | | | | 451/541 |
| 2017/0100816 A1* | 4/2017 | Wang | .................... | B24B 37/07 |

FOREIGN PATENT DOCUMENTS

| | | | | |
|---|---|---|---|---|
| JP | 01-097556 A | 4/1989 | | |
| JP | 6234763 B2 | 11/2017 | | |
| WO | 02/51588 A1 | 7/2002 | | |
| WO | WO-03000461 A1 * | 1/2003 | ............ | B24B 13/02 |
| WO | 2020/106419 A1 | 5/2020 | | |

OTHER PUBLICATIONS

Translation JP S62-034763; Takabayashi, Ruizhi; Method for Polishing a Convex Spherical Ferrule; Feb. 14, 1987 (Year: 1987).*
International Search Report and Written Opinion of the International Searching Authority; PCT/US19/058762; Mailed Feb. 13, 2020; 12 Pages; European Property Office.

\* cited by examiner

METHOD AND APPARATUS FOR FORMING A CONVEX END FACE IN A FERRULE

PRIORITY APPLICATION

This application is a continuation of International Application No. PCT/US19/58762, filed on Oct. 30, 2019, which claims the benefit of priority to U.S. Application No. 62/769,523, filed on Nov. 19, 2018, both applications being incorporated herein by reference.

TECHNICAL FIELD

This disclosure relates generally to optical connectivity, and more particularly to a method and associated apparatus for processing a ferrule for optical fiber applications so as to have a convex end face.

BACKGROUND

Optical fibers are useful in a wide variety of applications, including the telecommunications industry for voice, video, and data transmissions. In a telecommunications system that uses optical fibers, there are typically many locations where fiber optic cables that carry the optical fibers connect to equipment or other fiber optic cables. To conveniently provide these connections, fiber optic connectors are often provided on the ends of fiber optic cables. The process of terminating individual optical fibers from a fiber optic cable is referred to as "connectorization." Connectorization can be done in a factory, resulting in a "pre-connectorized" or "pre-terminated" fiber optic cable, or the field (e.g., using a "field-installable" fiber optic connector).

Regardless of where installation occurs, a fiber optic connector typically includes a ferrule with one or more bores that receive one or more optical fibers. The ferrule supports and positions the optical fiber(s) with respect to a housing of the fiber optic connector. Thus, when the housing of the fiber optic connector is mated with another connector (e.g., in an adapter), an optical fiber in the ferrule is positioned in a known, fixed location relative to the housing. This allows an optical connection to be established when the optical fiber is aligned with another optical fiber provided in the mating connector.

The optical fiber and ferrule end faces are generally flush with each other and in many cases the ferrule end face has a domed, convex geometry with the center of the optical fiber intended to be at the dome apex. This geometry insures close contact of fibers in an optical connection and minimizes reflections which may deteriorate the optical signal carried in the fibers. Such domed, convex geometry is often referred to as a "physical contact" geometry, and it may be a result of forming the end face of the ferrule prior to inserting the optical fiber, forming fiber and ferrule end faces together (e.g., after inserting the optical fiber into the ferrule and securing it relative to the ferrule), or some combination of these approaches. Regardless of the approach, it is important that the ferrule/fiber end faces be formed in a manner that achieves the desired precise geometry. Indeed, in many cases, the optical fiber and ferrule end faces must conform to relevant industry standards that specify requirements for apex offset (AO), radius of curvature (ROC), and fiber height for different physical contact geometries. Examples of physical contact geometries known in the industry include, but are not limited to, physical contact (PC), angled physical contact (APC), and ultra physical contact (UPC) geometries.

In a typical conventional approach, the convex end face in a ferrule/fiber assembly may be formed through a grinding process. In this regard, a grinding wheel having a concave interface may be brought to bear against a generally flat end face of the ferrule while the ferrule is rotating about its central axis. The end result is the ferrule having a convex end face generally matching the geometry of the grinding wheel's concave interface. By way of example, U.S. Pat. No. 5,583,290 discloses such a grinding process for forming a convex end face for a UPC connector. Such processes, however, have a number of drawbacks.

For example, because the ferrule is rotated about its central axis during the grinding process, the process is typically limited to applications where the fiber has not yet been attached to the ferrule. Otherwise, rotating the ferrule with an attached fiber would likely cause the fiber to break or detach from the ferrule. Additionally, due to the amount of material being removed from the interface, a grinding process using a fine abrasive may require a relatively long grind time, resulting in relatively low production rates. In some alternative grinding processes, a course abrasive may be used to facilitate material removal. However, grinding with a course abrasive does not generally provide the desired surface finish for the ferrule. Accordingly, additional processing steps are often required to form a smooth, highly polished ferrule end face. These additional processing steps require not only additional tooling and processing stations, but also require further processing time to perform the additional processing steps and to move between the various stations. Thus, production rates remain relatively low in this alternative approach.

In another traditional approach for processing APC connectors, for example, a ferrule having a flat end face is brought to bear against a surface of a non-compliant grinding platen having a relatively course abrasive at a certain angle. This forms a flat, non-convex angled end face on the ferrule. In a subsequent processing step, the flat, angled end face of the ferrule is brought to bear against a surface of a compliant grinding platen having a relatively course abrasive at a specified angle (e.g., 8°). This forms the angled convex end face of the APC connector. In a further processing step, the convex end face may be polished to remove defects from the end face and/or to slightly adjust the apex. By way of example, U.S. Pat. No. 5,432,880 discloses such a process for forming a convex end face for an APC connector. Similar to the above, however, this process also has some drawbacks. In this process, for example, the fiber is usually coupled to the ferrule, making the manipulation and movement of the ferrule/fiber assembly more difficult. Furthermore, the multi-step process increases production times, thus lowering production rates.

SUMMARY

To address these and other shortcomings, a method of processing a ferrule that includes an end face using at least one grinding wheel rotatable about a central axis is provided. The at least one grinding wheel has a working surface that includes an abrasive element. The method includes holding the ferrule stationary, engaging the end face of the ferrule and the working surface of the at least one grinding wheel, rotating the at least one grinding wheel about the central axis, and moving the at least one grinding wheel relative to the ferrule along a curve perpendicular to the central axis. In this way, the processing of the ferrule with the at least one grinding wheel imparts a convex shape on the end face of the ferrule.

In one embodiment, the curve along which the at least one grinding wheel is moved relative to the ferrule lies within a plane perpendicular to the central axis. Additionally, the curve along which the at least one grinding wheel is moved relative to the ferrule may have a constant radius of curvature. The working surface of the at least one grinding wheel may include a constant radius of curvature in a plane that is parallel to the central axis, and the constant radius of curvature of the curve along which the at least one grinding wheel is moved relative to the ferrule is equal to the constant radius of curvature of the working surface of the at least one grinding wheel. In this way, the ferrule may have a generally spherical end face (i.e., the end face forms a portion of a sphere).

In one embodiment, the at least one grinding wheel may include a plurality of grinding wheels each having a working surface, and a grinding wheel assembly may include the plurality of grinding wheels. In this case, the method further includes performing the engaging, rotating and moving steps with a first grinding wheel of the grinding wheel assembly, moving the grinding wheel assembly in a certain direction (such as in a direction outside the plane in which the curve lies), and performing the engaging, rotating and moving steps with a second grinding wheel of the grinding wheel assembly. Processing the ferrule using the plurality of grinding wheels imparts a convex shape on the end face of the ferrule. In one embodiment, moving the grinding wheel assembly may include moving the grinding wheel assembly in a direction parallel to the central axis.

Additionally, engaging the end face of the ferrule and the working surface of the first grinding wheel may further include engaging the end face of the ferrule with a first abrasive grit, and engaging the end face of the ferrule and the working surface of the second grinding wheel may further include engaging the end face of the ferrule with a second abrasive grit, wherein the second abrasive grit is different than the first abrasive grit. In another embodiment, the working surface of the first grinding wheel has a first radius of curvature, the working surface of the second grinding wheel has a second radius of curvature, and the second radius of curvature is different than the first radius of curvature. In one embodiment, one of the plurality of grinding wheels in the grinding wheel assembly may having a working surface that is substantially flat (e.g., a very large radius of curvature). In another embodiment, one of the plurality of grinding wheels in the grinding wheel assembly may have a working surface that is concave. Still further, the grinding wheel assembly may have a grinding wheel with a convex working surface.

In one embodiment, the method further includes aligning the ferrule with the working surface of the at least one grinding wheel such that a central axis of the ferrule is generally parallel to a radial line of the at least one grinding wheel that extends from the central axis to the point on the working surface that intersects with the central axis of the ferrule when the ferrule and working surface are engaged. In this orientation, the process may be used to form UPC-type connectors. In an alternative embodiment, the method may include aligning the ferrule with the working surface of the at least one grinding wheel such that a central axis of the ferrule forms an acute angle to a radial line of the at least one grinding wheel that extends from the central axis to the point on the working surface that intersects with the central axis of the ferrule when the ferrule and working surface are engaged. In this orientation, the process may be used to form APC-type connectors. In a further embodiment, a ferrule assembly comprises the ferrule and at least one optical fiber coupled to the ferrule, and wherein the holding and engaging steps are performed with the ferrule assembly.

In another embodiment, a method of processing a ferrule that includes an end face using a grinding wheel assembly having a plurality of different grinding wheels that are each rotatable about a central axis is provided. Each of the different grinding wheels has a working surface that includes an abrasive element. The method includes holding the ferrule stationary, and processing the ferrule sequentially with the different grinding wheels by performing each of the following steps for each of the different grinding wheels: engaging the end face of the ferrule and the working surface of the grinding wheel, rotating the grinding wheel about the central axis, and moving the grinding wheel relative to the ferrule along a curve perpendicular to the central axis. The curve may lie in a plane perpendicular to the central axis. In one embodiment, processing the ferrule sequentially with the different grinding wheels includes processing the ferrule with grinding wheels having respective working surfaces with progressively finer abrasive grit. In another embodiment, processing the ferrule sequentially with the different grinding wheels includes processing the ferrule with grinding wheels having respective working surfaces with progressively smaller radii of curvature. Between instances of processing the ferrule with the different grinding wheels, the method may include moving the grinding wheel assembly in a certain direction, such as in a direction outside a plane perpendicular to the central axis.

In a further embodiment, a method of processing a ferrule that includes an end face using at least one grinding wheel rotatable about a central axis is provided. The at least one grinding wheel has a working surface that includes an abrasive element. The method includes: a) engaging the end face of the ferrule and the working surface of the at least one grinding wheel while holding the ferrule stationary, b) rotating the at least one grinding wheel about the central axis, and c) moving the at least one grinding wheel relative to the ferrule along a curve perpendicular to the central axis, wherein steps a), b), and c) are performed simultaneously. The curve may lie in a plane perpendicular to the central axis. Processing of the ferrule using the at least one grinding wheel imparts a convex shape on the end face of the ferrule. In one embodiment, the at least one grinding wheel includes a plurality of grinding wheels, wherein steps a), b), and c) are performed for each of the grinding wheels in the plurality of grinding wheels. Processing the ferrule using the plurality of grinding wheels imparts a convex shape on the end face of the ferrule.

An apparatus for processing a ferrule with an abrasive element to impart a convex shape on an end face of the ferrule includes a first stationary mount to which the ferrule is configured to be secured, and a second mount to which at least one grinding wheel is mounted. The at least one grinding wheel includes a working surface that includes the abrasive element and is configured to be rotatable about a central axis. The apparatus further includes a controller operatively coupled to the second mount. The second mount is configured so that the at least one grinding wheel is movable along a curve perpendicular to the central axis. In an exemplary embodiment, the curve may lie in a plane that is perpendicular to the central axis.

In one embodiment, the working surface of the at least one grinding wheel includes a constant radius of curvature in a plane that is parallel to the central axis. Additionally, the controller may be configured to move the second mount so that the at least one grinding wheel traverses a curve having a constant radius of curvature. Furthermore, in one embodiment, the second mount may be configured so that the at least one grinding wheel is movable in a direction outside the plane, such as in a direction parallel to the central axis.

In one embodiment, the at least one grinding wheel may include a plurality of grinding wheels, each being rotatable about the central axis. The working surface of one of the plurality of grinding wheels may be substantially flat. Additionally or alternatively, the working surface of one of the plurality of grinding wheels may be concave. In one embodiment, the plurality of grinding wheels may include a first grinding wheel and a second grinding wheel. The first grinding wheel may have a working surface with a first abrasive grit and first radius of curvature, and the second grinding wheel may have a working surface with a second abrasive grit and a second radius of curvature. The first abrasive grit may be different than the second abrasive grit. Additionally or alternatively, the first radius of curvature may be different than the second radius of curvature.

In one embodiment, the second mount may include a multi-axis frame for moving the at least one grinding wheel within a plane in two directions orthogonal to each other. For example, the multi-axis frame may be a Cartesian coordinate frame having a first frame for moving the at least one grinding wheel in a first coordinate direction and a second frame for moving the at least one grinding wheel in a second coordinate direction. Alternatively, the multi-axis frame may be a cylindrical coordinate frame for moving the at least one grinding wheel in a radial direction and in an azimuthal direction. In this regard, the apparatus may include a pivot arm rotatable about a pivot point at a first end of the pivot arm, wherein the at least one grinding wheel may be mounted to an opposing end of the pivot arm. In one embodiment, the pivot arm may be extendable and retractable in a radial direction and may also rotate in the azimuthal direction. Additionally, the second mount may include a further frame for moving the at least one grinding wheel in a third direction perpendicular to the plane. In one embodiment, a ferrule assembly includes the ferrule and at least one optical fiber coupled to the ferrule, and wherein the apparatus is configured for processing the ferrule assembly.

BRIEF DESCRIPTION OF THE DRAWINGS

The accompanying drawings are included to provide a further understanding and are incorporated in and constitute a part of this specification. The drawings illustrate one or more embodiment(s), and together with the description serve to explain principles and operation of the various embodiments. Features and attributes associated with any of the embodiments shown or described may be applied to other embodiments shown, described, or appreciated based on this disclosure.

DETAILED DESCRIPTION

Figure 1:
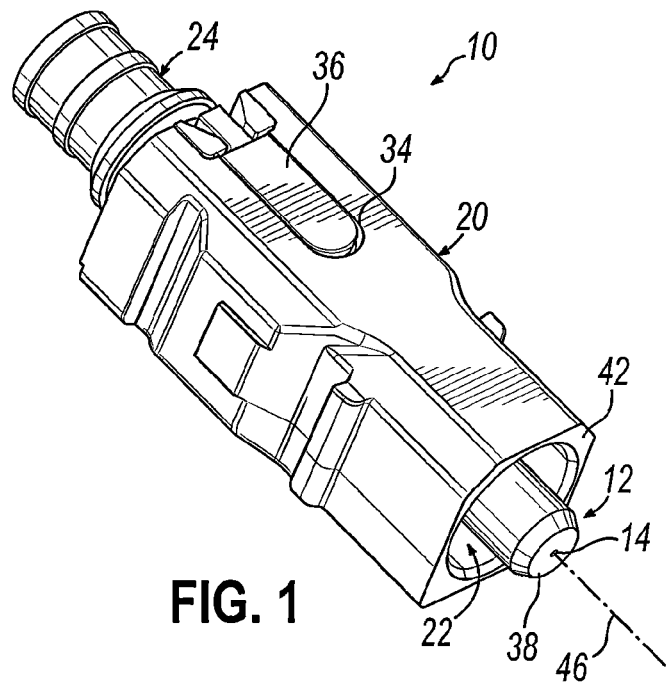
FIG. 1 is a perspective view of a fiber optic connector.

Various embodiments will be further clarified by examples in the description below. In general, the description relates to processing ferrules, such as those used in fiber optic connectors and fiber optic cable assemblies including the same. One example of a fiber optic connector 10 (also referred to as "optical connector 10", or simply "connector 10") is shown in FIG. 1. Although the connector 10 is shown in the form of a SC-type connector, the features described below may be applicable to different connector designs. This includes ST, LC, and MU-type connectors, for example, and other single-fiber or multi-fiber connector designs.

Figure 2:
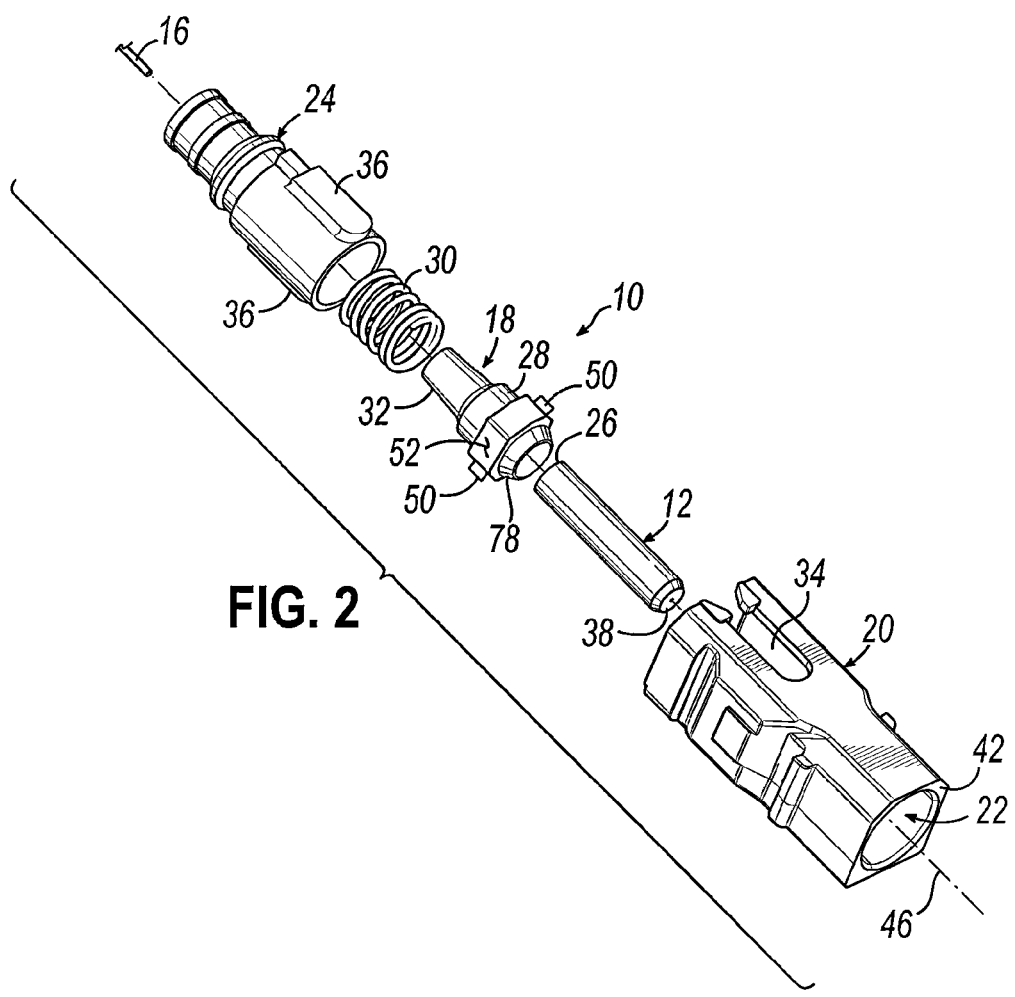
FIG. 2 is an exploded perspective view of the fiber optic connector shown in FIG. 1.

As shown in FIGS. 1 and 2, the connector 10 includes a ferrule 12 having a ferrule bore 14 ("micro-hole") configured to support an optical fiber 16, a ferrule holder 18 from which the ferrule 12 extends, a housing 20 having a cavity 22 in which the ferrule holder 18 is received, and a connector body 24 (also referred to as "retention body 24" or "crimp body 24") configured to retain the ferrule holder 18 within the housing 20. More specifically, a back end 26 of the ferrule 12 is received in a first portion 28 of the ferrule holder 18 and is secured therein in a known manner (e.g., press-fit, adhesive, molding the ferrule holder 18 over the back end 26 of the ferrule 12, etc.). The ferrule 12 and ferrule holder 18 may even be a monolithic structure in some embodiments.

The ferrule holder 18 is biased to a forward position within the housing 20 by a spring 30, which extends over a second portion 32 of the ferrule holder 18 that has a reduced cross-sectional diameter/width compared to the first portion 28. The spring 30 also interacts with internal geometry of the connector body 24, which may be secured to the housing 20 using a snap-fit or the like. For example, FIGS. 1 and 2 illustrate a rear portion of the housing 20 having cut-outs or slots 34 on opposite sides so as to define a split shroud. The connector body 24 has tabs 36 configured to be snapped into the slots 34 and retained therein due to the geometries of the components.

Figure 3:
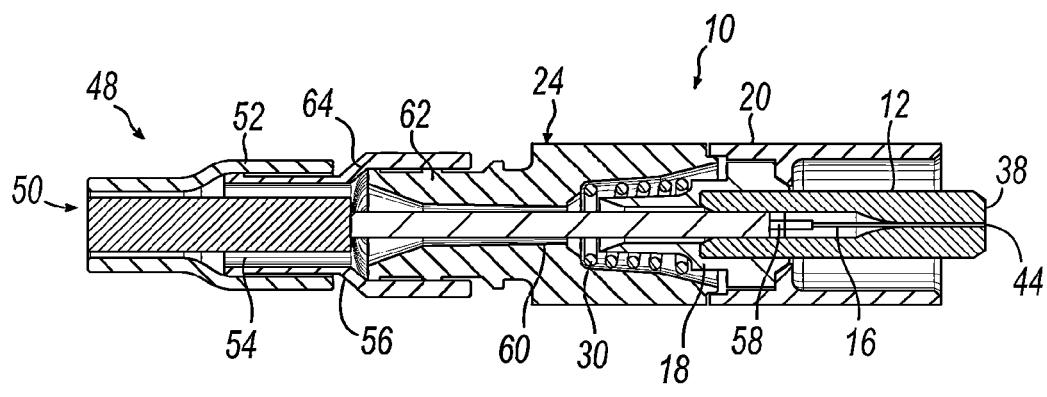
FIG. 3 is a cross-sectional view of the fiber optic connector of FIG. 1 installed on a fiber optic cable.

When the connector 10 is assembled as shown in FIG. 1, a front end 38 of the ferrule 12 ("ferrule end face 40") projects beyond a front end 42 of the housing 20. The ferrule end face 40 presents the optical fiber 16 ("fiber end 44") for optical coupling with a mating component (e.g., another fiber optic connector; not shown). Note that the ferrule 12 aligns the optical fiber 16 along a longitudinal axis 46. These aspects can be better appreciated with reference to FIG. 3, which shows how a fiber optic cable 48 (hereinafter "cable 48") including the optical fiber 16 can be terminated with the connector 10. In other words, the connector 10 can be installed on the cable 48 to form a fiber optic cable assembly 50. The cable 48 is merely an example to facilitate discussion. In the embodiment shown, the fiber cable 48 includes an outer jacket 52, inner jacket 54, strength members 56 in the form of aramid yarn, and the optical fiber 16, which itself has a coating 58 and a buffer layer 60 ("tight buffer"). Portions of the outer jacket 52 and inner jacket 54 have been removed from the optical fiber 16 to expose the strength members 56, which are cut to a desired length and placed over a rear portion 62 of the connector body 24. The strength members 56 are coupled to the connector body 24 by a crimp band 64 (also referred to as "crimp ring") that has been positioned over the optical fiber 16 and a portion of the strength members 56 and inner jacket 54. Again, the cable 48 is merely an example, as persons skilled in optical connectivity will appreciate how different cable designs may be terminated with the connector 10.

Figure 4:
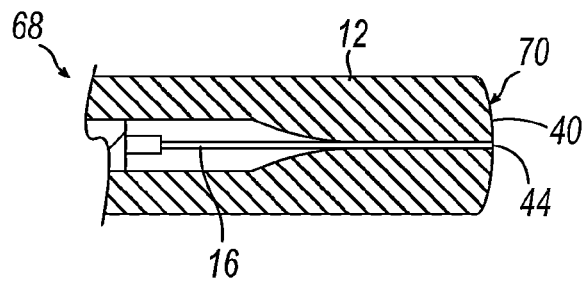
FIG. 4 schematically illustrates a ferrule assembly having a ferrule and optical fiber coupled together.

During the formation of the connector 10, the optical fiber 16 may be coupled to the ferrule 12 (e.g., secured to the ferrule bore 14 using an adhesive) in a connectorization process to provide a ferrule assembly 68. As used herein and illustrated in FIG. 4, a ferrule assembly 68 includes the ferrule 12 and the optical fiber 16 coupled together. The ferrule end face 40 and a front end of the optical fiber 16 ("fiber end 44") together define a mating interface 70 ("interface 70"). In one embodiment, the mating interface 70 may be generally domed or convex shaped with the optical fiber 16 positioned at or substantially at (i.e., within 50 microns of) the apex of the dome. Other geometries, however, may also be possible.

The ferrule 12 may be processed prior to inserting and securing the optic fiber 16, after inserting and securing the optical fiber 16 (such that the processing is of the ferrule assembly 68), or by a combination of these approaches. In some embodiments where the ferrule assembly 68 is processed, the processing may even occur when the ferrule assembly 68 is supported by the connector body 24 (and thereby assembled as part of the connector 10). For convenience, the description below will refer to processing the ferrule assembly 68. It will be appreciated, however, that the same processing may be performed with respect to the ferrule 12 without the optical fiber 16. Regardless of the approach, the ferrule 12 is processed in a manner that provides a convex end face 40 with a specified radius of curvature and apex location.

Figure 5:
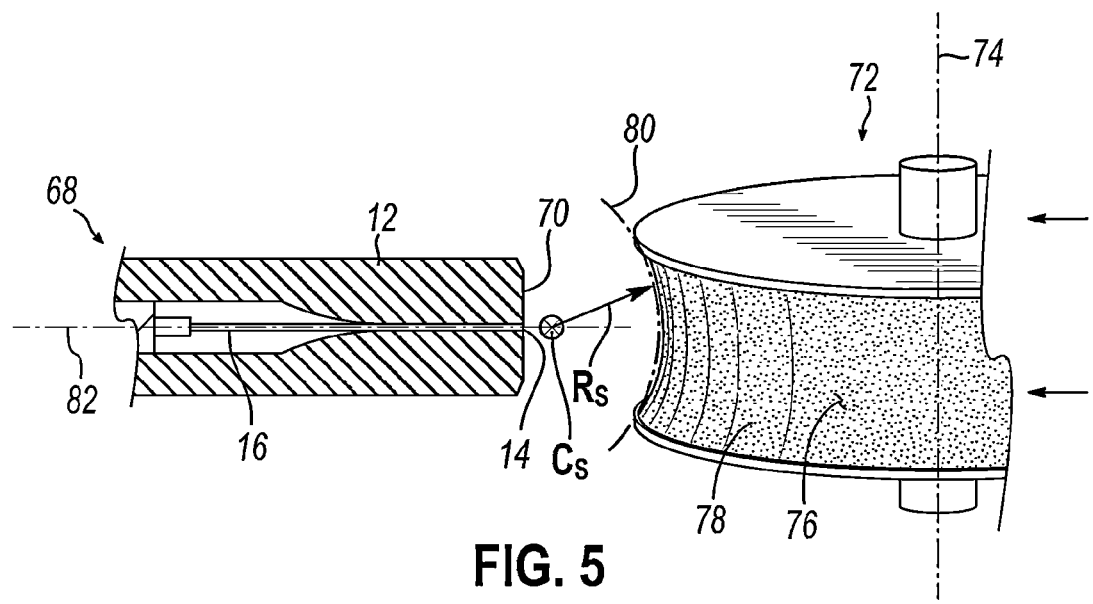
FIG. 5 schematically illustrates processing a mating interface of a ferrule assembly with a grinding wheel in accordance with an embodiment of the invention.
Figure 6:
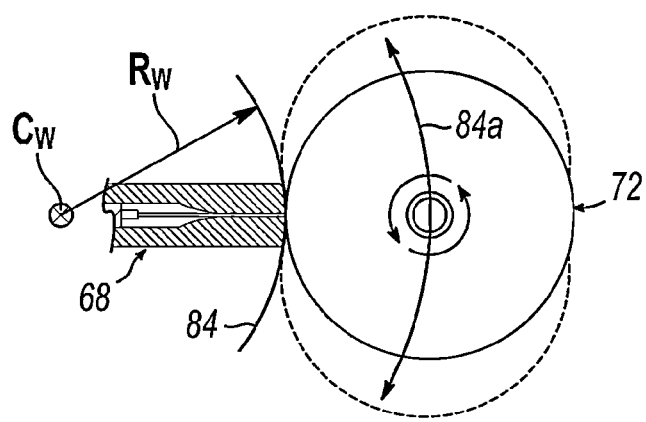
FIG. 6 is a top view of the embodiment illustrated in FIG. 5 illustrating the arcuate movement of the grinding wheel relative to the mating interface of the ferrule assembly.

In one embodiment and as schematically illustrated in FIGS. 5 and 6, the convex configuration of the mating interface 70 of the ferrule assembly 68 may be formed through a grinding process where material is removed from the ferrule assembly 68 in order to impart a specific geometry onto the mating interface 70. This is in distinction to a polishing process which is intended to clean and remove small defects in a surface but otherwise leave the overall geometry of the polished surface substantially unaffected. The grinding process according to an exemplary embodiment utilizes a grinding wheel 72 rotatable about its central axis 74 and which engages the front end of the ferrule assembly 68 along a working surface 76 that includes an abrasive element 78 along the circumference of the grinding wheel 72. In an exemplary embodiment, the working surface 76 may be concave but other shapes may be possible depending on the particular application. As illustrated in FIG. 5, in one embodiment, the working surface 76 forms a curve 80 (e.g., in cross section) in a plane that is generally parallel to the central axis 74 of the grinding wheel 72 (e.g., the z axis). The central axis 74 preferably lies within the plane. That curve 80 may be characterized by a radius of curvature $R_s$ having a center of curvature at a point $C_s$ as illustrated in FIG. 5. In one embodiment, the radius of curvature $R_s$ of the working surface 76 is substantially constant along the circumference of the grinding wheel 72 and is selected to match the desired radius of curvature $R_f$ of the mating interface 70 of the ferrule assembly 68.

Engagement of the front end of the ferrule assembly 68 and the working surface 76 of the grinding wheel in, for example, a fixed position would not completely form a convex mating interface 70. To complete the convex mating interface 70, there must be additional relative movement between the ferrule assembly 68 and the grinding wheel 72. In U.S. Pat. No. 5,683,290, for example, the approach that was taken was to spin or rotate the ferrule 12 about its central axis. In examining FIG. 5, one can understand how rotating the ferrule assembly 68 about a ferrule central axis 82 (defined by the ferrule bore 14) would result in a spherical mating interface 70 (i.e., the mating interface 70 would be a portion of a spherical surface having a radius of curvature as determined by the working surface 76). However, to overcome the issues raised in the background section above, a different approach is now taken in various embodiments.

More particularly and as illustrated in FIG. 6, in an exemplary embodiment, the ferrule assembly 68 may be held stationary and the grinding wheel 72, and more particularly the working surface 76 of the grinding wheel 72, may be moved along a prescribed path or curve 84 (the center of the grinding wheel 72 may traverse a related curve 84a). The curves 84, 84a may be perpendicular to the central axis 74 of the grinding wheel 72. In an exemplary embodiment, the paths 84, 84a may reside in a plane that is generally perpendicular to the central axis 74 of the grinding wheel 72 (e.g., the x-y plane from the perspective shown in FIGS. 5 and 6). The curve 84 may be characterized by a radius of curvature $R_w$ having a center of curvature at a point $C_w$ as illustrated in FIG. 6. Thus, the mating interface 70 of the ferrule assembly 68 may be characterized as having a first radius of curvature in a first direction and a second radius of curvature in a second direction that is orthogonal to the first direction.

In accordance with an embodiment, the first radius of curvature and the second radius of curvature may be formed by different means or mechanisms. In the instant case, for example, the first radius of curvature may be formed by the concave profile of the working surface 76 of the grinding wheel 72, and the second radius of curvature may be formed by the movement of the grinding wheel 72 relative to the stationary ferrule 12 along curve 84. Each of these formations may be independently controlled. For example, a manufacturer may have a plethora of grinding wheels 72 with working surfaces 76 having different radii of curvature and may pick a desired radius of curvature to fit a particular application. Additionally, the movement of the grinding wheel 72 along the curve 84 may be selected to provide different radii of curvature. Accordingly, a variety of convex mating interface geometries may be possible for ferrule assembly 68.

In one embodiment, the first and second radii of curvature may be substantially the same. In this regard, the radius of curvature $R_s$ of the working surface 76 of the grinding wheel 72 and the radius of curvature $R_w$ of the curve 84 traversed by the grinding wheel 72 may be substantially the same. In this case, the resulting convex mating interface 70 of the ferrule assembly 68 will be generally spherical (i.e., the mating interface 70 would form a portion of a spherical surface having a radius of $R_s$ and $R_w$). In an alternate embodiment, however, the first radius of curvature and the second radius of curvature may be different from each other. Thus, the radius of curvature $R_s$ of the working surface 76 may be different than the radius of curvature $R_w$ of the curve 84 along which the grinding wheel 72 is moved. The mating interface 70 of the ferrule assembly 68, while not being substantially spherical, will remain arcuate and convex.

Figure 7:
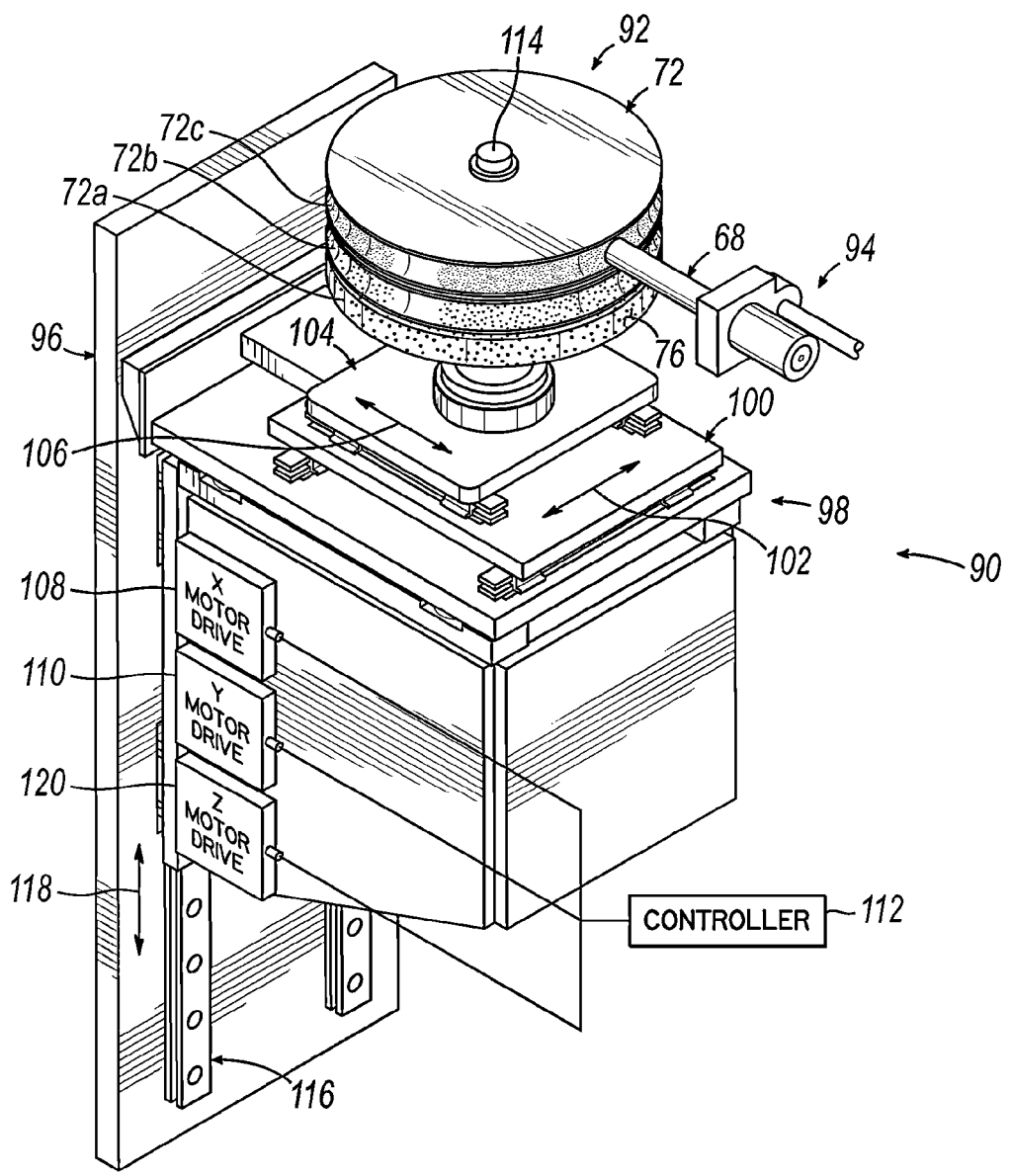
FIG. 7 schematically illustrates an apparatus for carrying out the processing of the mating interface of the ferrule assembly as demonstrated in FIGS. 5 and 6.

FIG. 7 illustrates an apparatus 90 for processing a front end of a ferrule assembly 68 so as to form a convex mating interface 70 according to the method as described above in reference to FIGS. 5 and 6. As mentioned above, the ferrule 12 may be processed by itself (i.e., before inserting and securing the optical fiber 16) and/or as part of the ferrule assembly 68 (i.e., after inserting and securing the optical fiber 16 in the ferrule 12). Thus, although the apparatus 90 as well as the other apparatuses discussed below are described with reference to processing the ferrule assembly 68, the disclosure may apply equally to situations where the ferrule 12 is at least partially processed separately from the optical fiber 16.

The apparatus 90 may be configured such that the ferrule assembly 68 is stationary while a rotating grinding wheel assembly 92 having at least one grinding wheel 72 with a concave working surface 76 is moved in a plane (x-y plane as described below) to generate the convex mating interface 70 in the ferrule assembly 68. In the embodiment shown, the ferrule assembly 68 is secured to a first mount 94 and the grinding wheel assembly 92 is secured to a second mount 96. The second mount 96 is configured to be movable. In this regard, the grinding wheel assembly 92 may be mounted to a multi-axis frame 98 having an x-stage 100 for moving the grinding wheel assembly 92 in a direction defined by an x-axis 102 and a y-stage 104 for moving the grinding wheel assembly 92 in a direction defined by a y-axis 106. The x-stage 100 includes a motor drive 108 for controlling an actuator (not shown) for moving the x-stage 100 along the x-axis 102 (i.e., in an x-direction). The y-stage 104 similarly includes a motor drive 110 for controlling an actuator for moving the y-stage 102 along the y-axis 92 (i.e., in a y-direction). The apparatus 90 thus provides for at least two degrees of freedom for moving the grinding wheel assembly 92 in the x-y plane in order to form the convex mating interface 70 of the ferrule assembly 68. The motor drives 108, 110 may be operatively coupled to a controller 112 for controlling the position of the grinding wheel assembly 92 relative to the ferrule assembly 68.

As illustrated in FIG. 7, the grinding wheel assembly 92 may include a plurality of grinding wheels 72 for processing the mating interface 70 of the ferrule assembly 68. In one embodiment, for example, the grinding wheel assembly 92 may include three grinding wheels 72a, 72b, 72c. It should be recognized, however, that more or less grinding wheels 72 may be included in the grinding wheel assembly 92. The grinding wheels 72a, 72b, 72c may be coaxially and sequentially mounted on a rotating shaft 114 of the apparatus 90 and be operatively coupled to a motor or other drive device (not shown) for causing the rotation of the shaft 114 and the grinding wheels 72 mounted thereon. In the event the grinding wheel assembly 92 includes two or more grinding wheels 72, the second mount 96 may further include a z-stage 116 for moving the grinding wheel assembly 92 in a direction defined by a z-axis 118. Similar to the above, the z-stage 116 includes a motor drive 120 for controlling an actuator (not shown) for moving the z-stage 116 along the z-axis 118 (i.e., in an z-direction). Moreover, the motor that drives the rotating shaft 114 and the motor drive 120 for the z-stage 116 may be operatively coupled to the controller 112 for controlling the rotation of the shaft 114 (e.g., rotation speed) and the z-axis movement of the grinding wheel assembly 92. More particularly, movement along the z-axis allows different grinding wheels 72a, 72b, 72c to be positioned so as to engage with the mating interface 70 of the ferrule assembly 68.

Providing multiple grinding wheels 72a, 72b, 72c on the grinding wheel assembly 92 allows for different operating protocols. For example, in one embodiment, most, if not all, of the grinding wheels 72 on the grinding wheel assembly 92 may be substantially the same. In this regard, the grinding wheels 72a, 72b, 72c may each have the same level of abrasive grit on the working surface 76 of the grinding wheels 72a, 72b, 72c. Moreover, the working surface 76 of the grinding wheels 72a, 72b, 72c may have the same radius of curvature $R_s$. For this arrangement, a particular grinding wheel 72a would be used to process the mating interface 70 of ferrule assemblies 68 until the working surface 76 of the grinding wheel 72a reached the end of its useful life (e.g., 200-500 ferrule assemblies) at which point the grinding process lacks sufficient quality. At this point, the controller 112 may be configured to actuate the z-stage motor drive 120 to move the grinding wheel assembly 92 such that another grinding wheel 72b aligns with the stationary ferrule assembly 68. Additional ferrule assemblies 68 may then be processed using the second grinding wheel 72b. This process may then be repeated until all of the grinding wheels 72 on the grinding wheel assembly 92 have been used to their fullest potential. This type of arrangement allows for an increased number of ferrule assemblies 68 to be processed without having to take the apparatus 90 out of operation to replace the grinding wheels 72.

In another embodiment, the working surface 76 of each of the grinding wheels 72a, 72b, 72c may have substantially the same radius of curvature $R_s$ but have different levels of abrasive grit on the working surfaces 76. By way of example, in this arrangement a first grinding wheel 72a may have a course grit on the working surface 76 and configured to do the substantial portion of material removal from the mating interface 70 of the ferrule assembly 68. Subsequent to processing the mating interface 70 with the first grinding wheel 72a, the controller 112 may be configured to actuate the z-stage motor drive 120 to move the grinding wheel assembly 92 such that a second grinding wheel 72b aligns with the stationary ferrule assembly 68. The second grinding wheel 72b may have medium or intermediate sized abrasive grit on the working surface 76 and is configured to smooth and possibly continue to shape the mating interface 70 of the ferrule assembly 68. Furthermore, subsequent to processing the mating interface 70 with the second grinding wheel 72b, the controller 112 may again be configured to actuate the z-stage motor drive 120 to move the grinding wheel assembly 92 such that a third grinding wheel 72b aligns with the stationary ferrule assembly 68. The third grinding wheel may have a fine abrasive grit on the working surface 76 and is configured to essentially polish the mating interface 70 of the ferrule assembly 68 to a smooth, fine finish.

This particular embodiment may be particularly beneficial in eliminating additional processing stations in a manufacturing line layout, since multiple operations on the mating interface 70 may now occur at a single station. In other words, the large-scale formation (grinding wheel 76a), intermediate-scale formation (grinding wheel 76b), and final, small-scale polishing (grinding wheel 76c) may occur at the same station and with the same apparatus. This embodiment may also be beneficial in reducing processing time since the amount of time to move the ferrule or ferrule assembly from one processing station to another processing station, and the amount of time required to mount the ferrule or ferrule assembly in various tooling are avoided. Furthermore, since these processing steps are executed by a single apparatus, fewer machines, tools, and other components are required, thus reducing operating costs.

In still a further alternative embodiment, the radius of curvature $R_s$ of each of the grinding wheels 72 of the grinding wheel assembly 92 may differ from each other or differ from at least one other grinding wheel 72. For example, in one embodiment, the first grinding wheel 72a may have a first radius of curvature that is greater than the radius of curvature of the second grinding wheel 72b, and the second grinding wheel 72b may have a radius of curvature greater than the radius of curvature of the third grinding wheel 72c. Thus, the radius of curvature of the working surface 76 of the grinding wheels 72 may sequentially decrease from one grinding wheel to the next grinding wheel. Other arrangements are also possible. For example, it should be realized that each of the grinding wheels 72 of the grinding wheel assembly 92 may not be limited to having a concave working surface 76. More particularly, one or more of the grinding wheels 72 may have a working surface 76 that is nearly or substantially flat, or even convex.

By way of example, in one embodiment, the first grinding wheel 72a may have a working surface that is substantially flat or planar (i.e., a very large radius of curvature). The first grinding wheel 72a may alternatively have a working surface that is convex. In these embodiments, the first grinding wheel 72a may be configured to remove a substantial portion of material at the mating interface 70 for forming the convex shape in the ferrule assembly 68. For example, the first grinding wheel 72a may be used in a manner that essentially "roughens in" the convex shape of the mating interface 70. Using a flat or convex grinding wheel for this purpose prevents excessive wear on a concave grinding wheel, which typically occurs near its outer edges since the greatest material removal occurs at the outer edges of the ferrule assembly 68. In any event, preferably at least one of the grinding wheels 72 of the grinding wheel assembly 92 includes a grinding wheel 72 having a working surface 76 that is concave in its profile so as to ultimately impart a smooth convex shape to the mating interface 70 of the ferrule assembly 68.

Figure 8:
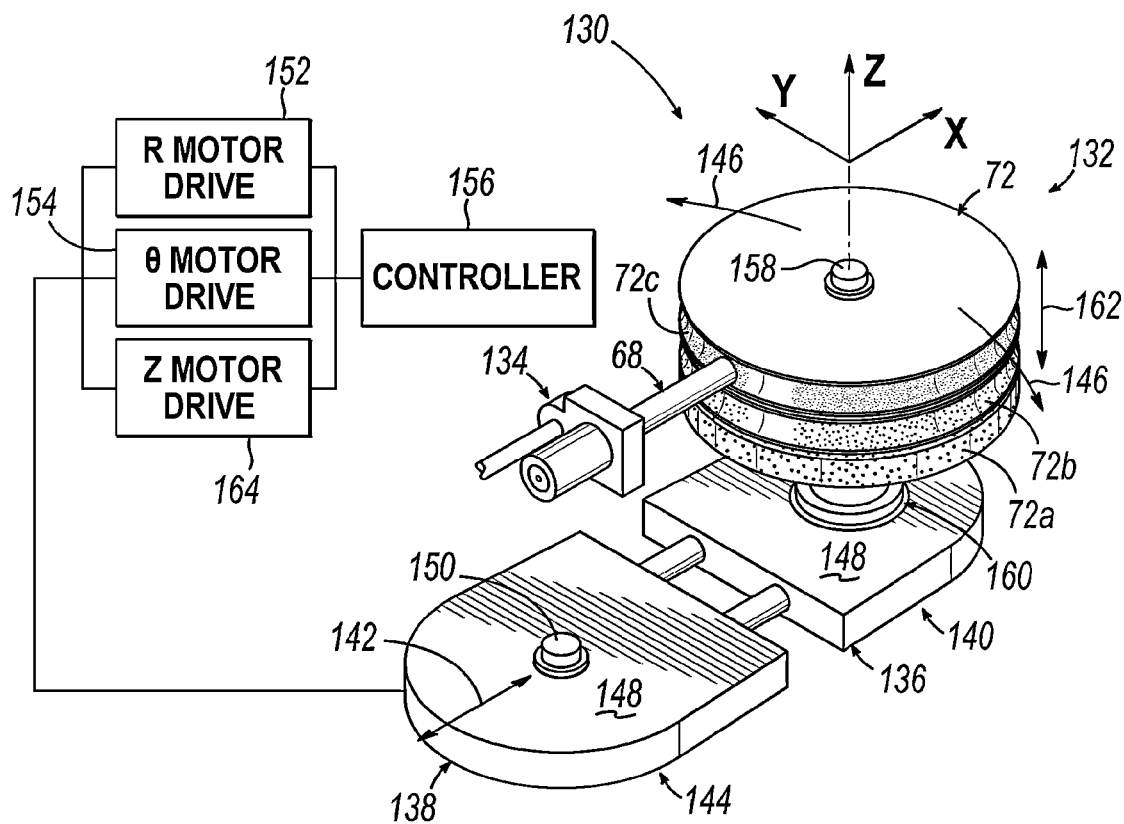
FIG. 8 schematically illustrates another apparatus for carrying out the processing of the mating interface of the ferrule assembly as demonstrated in FIGS. 5 and 6.

In the apparatus 90 described above, the second mount 96 utilized a multi-axis frame 98 based on a Cartesian coordinate system to move the grinding wheels 72 within the plane that is perpendicular to the central axis 76. Thus, the multi-axis frame 98 included an x-stage 100 for moving the grinding wheels 72 in the x-direction 102 and a y-stage 104 for moving the grinding wheels 72 in the y-direction 106. In an alternative embodiment, however, a multi-axis frame based on a cylindrical coordinate system may be used. In this regard, FIG. 8 illustrates an apparatus 130 for processing a front end of a ferrule assembly 68 so as to form a convex mating interface 70 according to the method as described above in reference to FIGS. 5 and 6. As mentioned above, the ferrule 12 may be processed by itself (i.e., before inserting and securing the optical fiber 16) and/or as part of the ferrule assembly 68 (i.e., after inserting and securing the optical fiber 16 in the ferrule 12).

The apparatus 130 may be configured such that the ferrule assembly 68 is stationary while a rotating grinding wheel assembly 132 having at least one grinding wheel 72 with a concave working surface 76 is moved in a plane (r-θ plane as described below) to generate the convex mating surface 70 in the ferrule assembly 68. In the embodiment shown, the ferrule assembly 68 is secured to a first mount 134 and the grinding wheel assembly 132 is secured to a second mount 136. The second mount 136 is configured to be movable. In this regard, the grinding wheel assembly 132 may be mounted to a multi-axis frame 138 having a r-stage 140 for moving the grinding wheel assembly 132 in a direction defined by a r-axis 142 and an azimuthal-stage 144 for moving the grinding wheel assembly 132 in a direction defined by an azimuthal or θ-axis 146. More particularly, the second mount 136 may include a pivot arm 148 extending in the radial direction and defining a pivot point 150 at one end thereof. The grinding wheel assembly 132 may be mounted to an opposing end of the pivot arm 148. The r-stage 140 includes a motor drive 152 for controlling an actuator (not shown) for expanding and contracting the pivot arm 148 along the r-axis 142 (i.e., in the radial direction). The azimuthal-stage 144 similarly includes a motor drive 154 for controlling an actuator for moving the azimuthal-stage 144 along the azimuthal-axis 146 (i.e., in the θ direction). The apparatus 130 thus provides for at least two degrees of freedom for moving the grinding wheel assembly 132 in the r-θ plane in order to form the convex mating interface 70 of the ferrule assembly 68. The motor drives 152, 154 may be operatively coupled to a controller 156 for controlling the position of the grinding wheel assembly 132 relative to the ferrule assembly 68.

As illustrated in FIG. 8 and similar to the above, the grinding wheel assembly 132 may include a plurality of grinding wheels 72 for processing the mating interface 70 of the ferrule assembly 68. In one embodiment, for example, the grinding wheel assembly 132 may include three grinding wheels 72a, 72b, 72c. It should be recognized, however, that more or less grinding wheels 72 may be included in the grinding wheel assembly 132. The grinding wheels 72a, 72b, 72c may be coaxially and sequentially mounted on a rotating shaft 158 of the apparatus 130 and be operatively coupled to a motor or other drive device (not shown) for causing the rotation of the shaft 158 and the grinding wheels 72. In the event the grinding wheel assembly 132 includes two or more grinding wheels 72, the second mount 136 may further include a z-stage 160 for moving the grinding wheel assembly 132 in a direction defined by a z-axis 162. Similar to the above, the z-stage 160 includes a motor drive 164 for controlling an actuator (not shown) for moving the z-stage 160 along the z-axis 162 (i.e., in an z-direction). Moreover, the motor that drives the rotating shaft 158 and the motor drive 164 for the z-stage 160 may be operatively coupled to the controller 156 for controlling the rotation of the shaft 158 (e.g., rotation speed) and the z-axis movement of the grinding wheel assembly 132. More particularly, movement along the z-axis allows different grinding wheels 72a, 72b, 72c to be positioned so as to engage with the mating interface 70 of the ferrule assembly 68.

Figure 9:
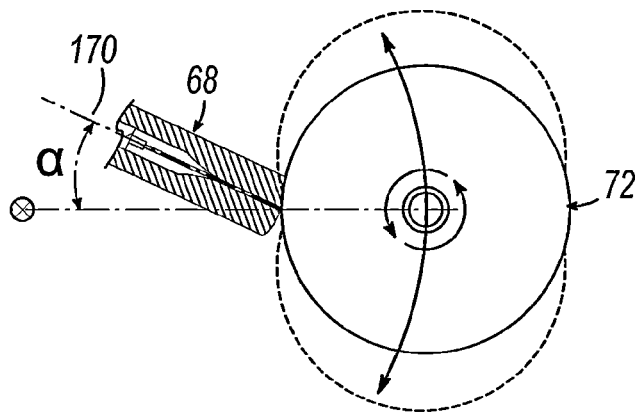
FIG. 9 schematically illustrates the formation of an angled mating interface of a ferrule assembly.

While FIGS. 5-8 generally described processes and apparatus for forming ferrules 12 or ferrule assemblies 68 having non-angled connectors, i.e., UPC-type connectors, the processes and apparatus are not so limited. In this regard, the various concepts and apparatus described above may be slightly modified to provide angled or APC-type connectors. By way of example and in a further alternative embodiment, FIG. 9 schematically illustrates forming an APC-type connector. In this regard, the orientation of the ferrule assembly 68 relative to the grinding wheel(s) 72 of the grinding wheel assembly 132 may be modified to provide the desired angle in the mating interface 70. For UPC-type connectors as demonstrated in FIG. 6, for example, a central axis 170 of the ferrule assembly 68 is generally parallel to a radial line of the grinding wheel 72 that extends from the central axis 74 to the point on the working surface 76 that intersects with the central axis 170 of the ferrule assembly 68 when the ferrule assembly 68 and the working surface 76 of the grinding wheel 72 are engaged. In other words, the central axis 170 of the ferrule assembly 68 extends in a radial direction of the grinding wheel 72.

For APC-type connectors, this may not be the case. For example, as illustrated in FIG. 9, the central axis 170 of the ferrule assembly 68 may form an acute angle α relative to the radial line of the grinding wheel 72 that extends from the central axis 74 to the point on the working surface 76 that intersects with the central axis 170 of the ferrule assembly 68 when the ferrule assembly 68 and the working surface 76 of the grinding wheel 72 are engaged. The acute angle α may be selected so as to provide the desired angle of the resulting connector. In one embodiment, the ferrule assembly 68 and grinding wheel 72 may be angled relative to each other so as to remain in the same plane, as illustrated in FIG. 9. In this arrangement, the central axis 170 of the ferrule assembly 68 and the central axis 74 of the grinding wheel 72 remain perpendicular to each other. In another embodiment, however, the ferrule assembly 68 and grinding wheel 72 may be angled relative to each other to provide the acute angle α but arranged to generally not lie within the same plane. In this arrangement, the central axis 170 of the ferrule assembly 68 and the central axis 74 of the grinding wheel 72 are not perpendicular to each other. Thus, the apparatus 90, 130 may be utilized to provide a wide variety of convex mating interfaces 70 in ferrule assemblies 68.

Those skilled in the art will appreciate that other modifications and variations can be made without departing from the spirit or scope of the invention. For example, although the ferrule assemblies 68 are described above as being supported by respective connector bodies (e.g., the connector body 24 in FIG. 1) of fiber optic connectors during the processing, in alternative embodiments the ferrule assemblies may be processed before being assembled together with a respective connector body. Moreover, in some embodiments, the ferrule assemblies may not be intended for use in fiber optic connectors, but instead for other optical components, such as as attenuators, optical couplers, isolators, collimators, filters, switches, wavelength division multiplexing (WDM) modules, etc. Since modifications, combinations, sub-combinations, and variations of the disclosed embodiments incorporating the spirit and substance of the invention may occur to persons skilled in the art, the invention should be construed to include everything within the scope of the appended claims and their equivalents.

What is claimed is:

1. A method of processing a ferrule that includes an end face using at least one grinding wheel that is rotatable about a central axis, the at least one grinding wheel having a working surface that includes an abrasive element, the method comprising:
    engaging the end face of the ferrule and the working surface of the at least one grinding wheel, wherein the working surface is on an outermost circumference of the at least one grinding wheel;
    rotating the at least one grinding wheel about the central axis; and
    moving the at least one grinding wheel relative to the ferrule along a curve within a plane at an angle relative to the central axis,
    wherein processing the ferrule with the at least one grinding wheel imparts a convex shape on the end face of the ferrule.

2. The method of claim 1, wherein the angle for the plane within which the curve along which the at least one grinding wheel is moved relative to the ferrule is substantially perpendicular to the central axis.

3. The method of claim 1, wherein the curve along which the at least one grinding wheel is moved relative to the ferrule has a constant radius of curvature.

4. The method of claim 3, wherein the working surface of the at least one grinding wheel has a constant radius of curvature in a plane that is parallel to the central axis, and wherein the constant radius of curvature of the curve along which the at least one grinding wheel is moved relative to the ferrule is equal to the constant radius of curvature of the working surface of the at least one grinding wheel.

5. The method of claim 1, wherein the at least one grinding wheel comprises a plurality of grinding wheels each having a working surface, and wherein a grinding wheel assembly comprises the plurality of grinding wheels, the method further comprising:
    performing the engaging, rotating, and moving steps with a first grinding wheel of the grinding wheel assembly;
    moving the grinding wheel assembly; and
    performing the engaging, rotating, and moving steps with a second grinding wheel of the grinding wheel assembly,
    wherein processing the ferrule using the plurality of grinding wheels imparts the convex shape on the end face of the ferrule.

6. The method of claim 5, wherein moving the grinding wheel assembly comprises moving the grinding wheel assembly in a direction parallel to the central axis.

7. The method of claim 5, wherein:
    engaging the end face of the ferrule and the working surface of the first grinding wheel further comprises engaging the end face of the ferrule with a first abrasive grit;
    engaging the end face of the ferrule and the working surface of the second grinding wheel further comprises engaging the end face of the ferrule with a second abrasive grit; and
    the second abrasive grit is different than the first abrasive grit.

8. The method of claim 5, wherein the working surface of the first grinding wheel has a first radius of curvature, the working surface of the second grinding wheel has a second radius of curvature, and the second radius of curvature is different than the first radius of curvature.

9. The method of claim 5, wherein the working surface of one of the first and second grinding wheels is substantially flat.

10. The method of claim 5, wherein the working surface of one of the first and second grinding wheels is concave.

11. The method of claim 1, further comprising aligning the ferrule with the working surface of the at least one grinding wheel such that a central axis of the ferrule is parallel to a radial line of the at least one grinding wheel that extends from the central axis to the point on the working surface that intersects with the central axis of the ferrule when the end face of the ferrule and the working surface are engaged.

12. The method of claim 1, further comprising aligning the ferrule with the working surface of the at least one grinding wheel such that a central axis of the ferrule forms an acute angle to a radial line of the at least one grinding wheel that extends from the central axis to the point on the working surface that intersects with the central axis of the ferrule when the end face of the ferrule and the working surface are engaged.

13. The method of claim 1, wherein a ferrule assembly comprises the ferrule and at least one optical fiber coupled to the ferrule, and wherein the holding and engaging are performed with the ferrule assembly.

14. A method of processing a ferrule that includes an end face using a grinding wheel assembly having a plurality of different grinding wheels that are each rotatable about a central axis, wherein each of the different grinding wheels has a working surface that includes an abrasive element, the method comprising:

processing the ferrule sequentially with the different grinding wheels by performing each of the following steps for each of the different grinding wheels:

engaging the end face of the ferrule and the working surface of the grinding wheel, wherein the working surface is on an outermost circumference of the grinding wheel;

rotating the grinding wheel about the central axis; and moving the grinding wheel relative to the ferrule along a curve within a plane at an angle relative to the central axis.

15. The method of claim 14, wherein processing the ferrule sequentially with the different grinding wheels comprises processing the ferrule with grinding wheels having respective working surfaces with progressively finer abrasive grit.

16. The method of claim 14, wherein processing the ferrule sequentially with the different grinding wheels comprises processing the ferrule with grinding wheels having respective working surfaces with progressively smaller radii of curvature.

17. The method of claim 14, wherein between instances of processing the ferrule with the different grinding wheels, the method further comprises:

moving the grinding wheel assembly in a direction outside the plane at an angle relative to the central axis.

18. A method of processing a ferrule that includes an end face using at least one grinding wheel that is rotatable about a central axis, the at least one grinding wheel having a working surface that includes an abrasive element, the method comprising:

a) engaging the end face of the ferrule and the working surface of the at least one grinding wheel while holding the ferrule stationary, wherein the working surface is on an outermost circumference of the at least one grinding wheel;

b) rotating the at least one grinding wheel about the central axis; and c) moving the at least one grinding wheel relative to the ferrule along a curve within a plane at an angle relative to the central axis;

wherein steps a), b), and c) are performed simultaneously, and wherein processing the ferrule using the at least one grinding wheel imparts a convex shape on the end face of the ferrule.

19. The method of claim 18, wherein the at least one grinding wheel includes a plurality of grinding wheels, wherein steps a), b), and c) are performed for each of the grinding wheels in the plurality of grinding wheels, and wherein processing the ferrule using the plurality of grinding wheels imparts the convex shape on the end face of the ferrule.

* * * * *